(12) United States Patent
Doshi et al.

(10) Patent No.: US 12,442,934 B2
(45) Date of Patent: Oct. 14, 2025

(54) REALTIME GRAPHICAL USER INTERFACE ILLUSTRATING GLOBAL NAVIGATION SATELLITE SYSTEM ACQUISITION

(71) Applicant: Sony Group Corporation, Tokyo (JP)

(72) Inventors: Jignesh Doshi, Carlsbad, CA (US); Andrew Estrada, Escondido, CA (US)

(73) Assignee: SONY GROUP CORPORATION, Tokyo (JP)

( * ) Notice: Subject to any disclaimer, the term of this patent is extended or adjusted under 35 U.S.C. 154(b) by 390 days.

(21) Appl. No.: 17/849,528

(22) Filed: Jun. 24, 2022

(65) Prior Publication Data

US 2023/0280473 A1 Sep. 7, 2023

Related U.S. Application Data

(60) Provisional application No. 63/268,965, filed on Mar. 7, 2022.

(51) Int. Cl.
*G01S 19/36* (2010.01)
*G01S 19/32* (2010.01)

(52) U.S. Cl.
CPC .............. *G01S 19/36* (2013.01); *G01S 19/32* (2013.01)

(58) Field of Classification Search
CPC ................................. G01S 19/36; G01S 19/32
See application file for complete search history.

(56) References Cited

U.S. PATENT DOCUMENTS

| 11,447,273 B1 * | 9/2022 | Sherman | ............ H04B 7/18513 |
| 2009/0135062 A1 | 5/2009 | Hori | |
| 2011/0187596 A1 * | 8/2011 | Rao | ........ G01S 19/258 |
| | | | 342/357.66 |
| 2013/0176171 A1 * | 7/2013 | Webber | ............ G01S 19/36 |
| | | | 342/357.76 |
| 2013/0285854 A1 * | 10/2013 | Gobara | ............ G01S 19/34 |
| | | | 342/374 |
| 2015/0063079 A1 * | 3/2015 | Kotaki | ............ G04F 10/00 |
| | | | 368/47 |

(Continued)

FOREIGN PATENT DOCUMENTS

| CN | 114152185 A | 3/2022 | |
| WO | WO-2010102331 A1 * | 9/2010 | ............ G01S 19/22 |

OTHER PUBLICATIONS

Furuno, "Furuno Field Time Sync Generator", TB-1, Operation Manual (Document No. SE20-900-014-02), Mar. 21, 2021 (Mar. 21, 2021), XP093041689, [retrieved on Apr. 24, 2023], pp. 1-18.

(Continued)

*Primary Examiner* — Vladimir Magloire
(74) *Attorney, Agent, or Firm* — Trellis IP Law Group, PC

(57) ABSTRACT

An apparatus includes one or more processors and logic encoded in one or more non-transitory media for execution by the one or more processors and when executed operable to receive a request from a user for one or more services associated with satellites. The logic is further operable to while performing an initialization process, provide a graphical user interface (GUI) that includes information about one or more of the satellites. The logic is further operable to determine that the initialization process is complete. The logic is further operable to update the GUI to include an option to provide the one or more services associated with the satellites.

18 Claims, 9 Drawing Sheets

(56) References Cited

U.S. PATENT DOCUMENTS

| | | | |
|---|---|---|---|
| 2015/0365870 A1* | 12/2015 | Lauer | H04W 28/0268 |
| 2018/0310124 A1* | 10/2018 | Regan | H04W 4/021 |
| 2021/0239851 A1 | 8/2021 | Gao | |
| 2023/0384460 A1* | 11/2023 | Yoshida | G01S 19/28 |

OTHER PUBLICATIONS

Furuno, "Delay measurement and frequency measurement of atomic oscillator class (TB-1)", Sep. 8, 2021 (Sep. 8, 2021), XP93041687, pp. 1-2.

Julian Ilett "Playing with GPS: Ublox Neo-7M and U-Center", Oct. 10, 2015 (Oct. 10, 2015), XP093041787, pp. 1-2.

NTT, et al, "GPS Time Synchronization with World-Class Accuracy using a Few Selected Satellites—Multi-path-tolerant GNSS receiver developed, dramatically increasing accuracy in severe environments-", I Press Release I NTT, Oct. 23, 2018 (Oct. 23, 2018), XP093041789, pp. 1-8.

Rohde & Schwarz, "Satellite Navigation Digital Standards for R&S SMBV100A Operating Manual", Operating Manual Version 14, KIIO 1415.8060.xx, Jun. 16, 2020 (Jun. 16, 2020), XP93041788, pp. 1-256.

Septentrio, RxTools: GNSS receiver control and analysis software, https://www.septentrio.com/en/products/software/rxtools, Jun. 21.

\* cited by examiner

350

REALTIME GRAPHICAL USER INTERFACE ILLUSTRATING GLOBAL NAVIGATION SATELLITE SYSTEM ACQUISITION

CROSS REFERENCES TO RELATED APPLICATIONS

This application claims the benefit of U.S. Provisional Patent Application Ser. No. 63/268,965, entitled, "Real-time GUI illustrating GNSS acquisition progress to increase the probability of efficiently acquiring a GNSS system", filed on Mar. 7, 2022 (SYP348114US01), which is hereby incorporated by reference as if set forth in full in this application for all purposes.

BACKGROUND

Global navigation satellite systems (GNSS) send position and timing data to devices on earth. Examples of GNSS include Global Positioning Systems (GPS) in the United States, Global Orbiting Navigation Satellite Systems (GLONASS) in Russia, BeiDou in China, Galileo in the European Union, QZSS in Japan, and NavIC in India. GNSS is used for, among other things, tracking/mapping devices, industrial machinery, sea vessels, air navigation, and automobiles.

GNSS satellites provide ranging signals and navigation data to GNSS receivers that are part of user devices. When a GNSS receiver is activated, such as when a user wants to use the GNSS receiver to track the user's position during a trip, the GNSS receiver needs up to a minute to acquire signals and decode data. However, even when users understand that they need to wait before starting an activity with the GNSS receivers, the users are too impatient to wait. Starting the activity too early may result in poor performance of the GNSS receivers because the GNSS receivers are much less likely to efficiently acquire and accurately provide trajectories.

Current approaches to addressing these problems typically rely on a graphical user interface (GUI) progress bar or a time counter. These approaches are too bland and the user will often ignore the GUIs and start the activity despite GUIs making it clear that the user needs to wait.

SUMMARY

In some embodiments, an apparatus includes one or more processors and logic encoded in one or more non-transitory media for execution by the one or more processors and when executed operable to receive a request from a user for one or more services associated with satellites. The logic is further operable to while performing an initialization process, provide a graphical user interface (GUI) that includes information about one or more of the satellites. The logic is further operable to determine that the initialization process is complete. The logic is further operable to update the GUI to include an option to provide the one or more services associated with the satellites.

In some embodiments, the information about the one or more of the satellites includes position and velocity information, a status of the one or more of the satellites including an identification of the one or more of the satellites that are active for one or more types of GNSS, and a status of a GNSS receiver. In some embodiments, the information about the satellites includes a signal quality status for each the one or more of the satellites based on an identification of each type of band with a signal and a frequency of the signal for each type of band, where the type of band is selected from the group of L1-Coarse/Acquisition (C/A), L1-P(Y), L2-P(Y), L2C, L5, and combinations thereof. In some embodiments, the information about the satellites includes a map of an identity and a path of the one or more of the satellites. In some embodiments, the information about the satellites includes a signal quality status selected from the group of an overall signal quality status, main signal quality status, main Radio Frequency (RF) power quality status, a Computer Processing Unit (CPU) quality status, base measurements quality status, and combinations thereof. In some embodiments, the information about the one or more satellites includes a multipath plot that is used to analyze multipath errors. In some embodiments, the information about the one or more satellites includes ionospheric variation based on a dual frequency carrier difference. In some embodiments, the information about the one or more satellites includes one or more radar signals corresponding to the one or more satellites as a function of time. In some embodiments, the initialization process includes acquisition of signals from the satellites, decoding time-of-week (TOW) information, and ephemeris decoding. In some embodiments, the information about the one or more satellites is retrieved from storage.

In some embodiments, a computer-implemented method comprises receiving a request from a user for one or more services associated with satellites, while performing an initialization process, providing a GUI that includes information about one or more of the satellites, determining that the initialization process is complete, and updating the GUI to include an option to provide the one or more services associated with the satellites.

In some embodiments, the information about the one or more of the satellites includes position and velocity information, a status of the one or more of the satellites including an identification of the one or more of the satellites that are active for one or more types of GNSS, and a status of a GNSS receiver. In some embodiments, the information about the satellites includes a signal quality status for each the one or more of the satellites based on an identification of each type of band with a signal and a frequency of the signal for each type of band, where the type of band is selected from the group of L1-Coarse/Acquisition (C/A), L1-P(Y), L2-P(Y), L2C, L5, and combinations thereof. In some embodiments, the information about the satellites includes a map of an identity and a path of the one or more of the satellites. In some embodiments, the information about the satellites includes a signal quality status selected from the group of an overall signal quality status, main signal quality status, main Radio Frequency (RF) power quality status, a Computer Processing Unit (CPU) quality status, base measurements quality status, and combinations thereof.

In some embodiments, software encoded in one or more computer-readable media for execution by the one or more processors when executed is operable to: receive a request from a user for one or more services associated with satellites, while performing an initialization process, provide a GUI that includes information about one or more of the satellites, determine that the initialization process is complete, and update the GUI to include an option to provide the one or more services associated with the satellites.

In some embodiments, the information about the one or more of the satellites includes position and velocity information, a status of the one or more of the satellites including an identification of the one or more of the satellites that are active for one or more types of GNSS, and a status of a GNSS receiver. In some embodiments, the information about the satellites includes a signal quality status for each the one or more of the satellites based on an identification of each type of band with a signal and a frequency of the signal for each type of band, where the type of band is selected from the group of L1-Coarse/Acquisition (C/A), L1-P(Y), L2-P(Y), L2C, L5, and combinations thereof. In some embodiments, the information about the satellites includes a map of an identity and a path of the one or more of the satellites. In some embodiments, the information about the satellites includes a signal quality status selected from the group of an overall signal quality status, main signal quality status, main Radio Frequency (RF) power quality status, a Computer Processing Unit (CPU) quality status, base measurements quality status, and combinations thereof.

The technology described below advantageously ensures that an initialization process for acquiring signals from the satellites, decoding time-of-week (TOW) information, and ephemeris decoding are performed before tracking is started by providing GUIs that are educational, entertaining, and that help the user understand the complexity of the satellite system.

A further understanding of the nature and the advantages of particular embodiments disclosed herein may be realized by reference of the remaining portions of the specification and the attached drawings.

DETAILED DESCRIPTION OF EMBODIMENTS

Example Environment 100

Figure 1:
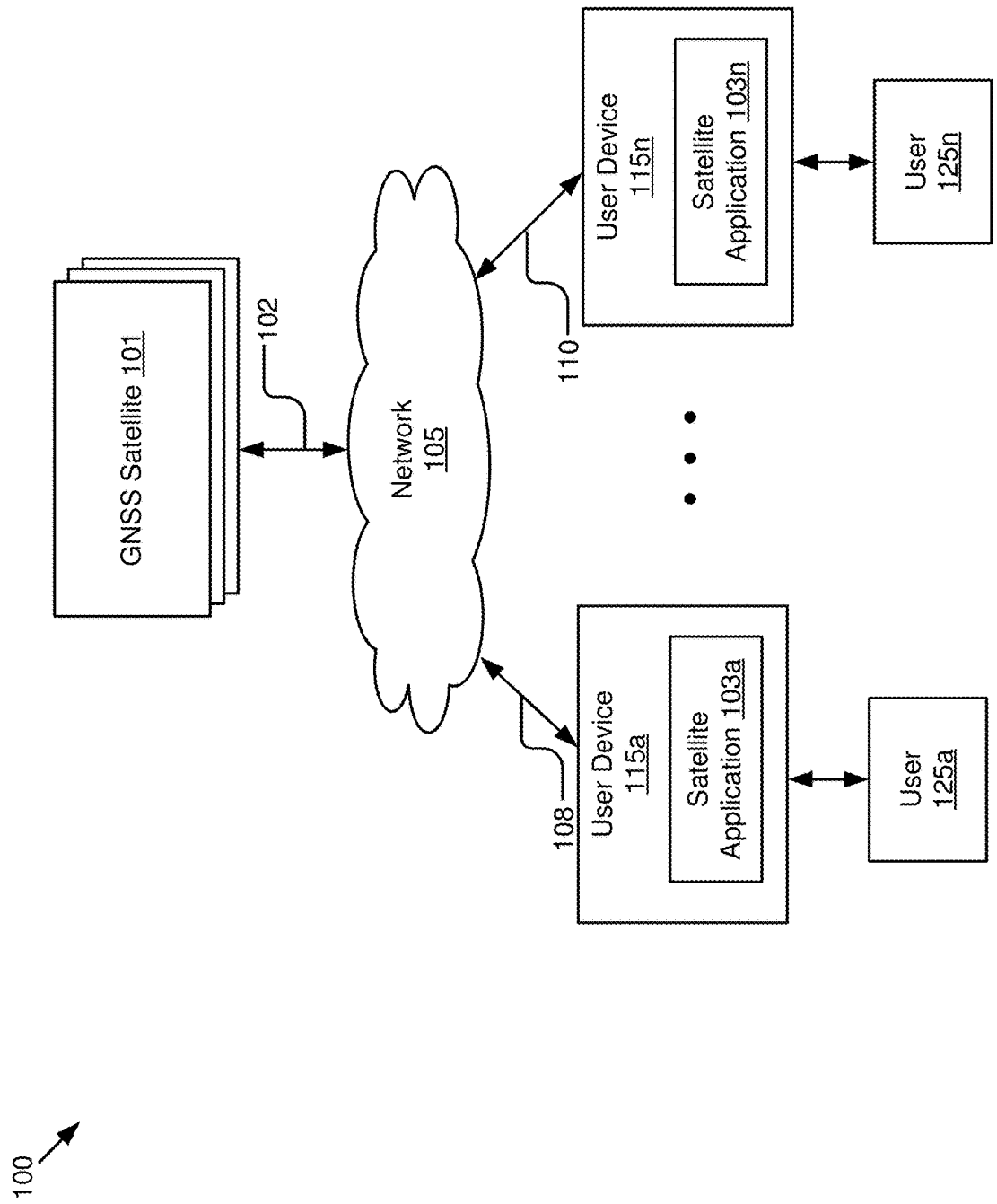
FIG. 1 is a block diagram of an example network environment according to some embodiments described herein.

FIG. 1 illustrates a block diagram of an example environment 100. In some embodiments, the environment 100 includes global navigation satellite system (GNSS) satellites 101 and user devices 115a, 115n. Users 125a, 125n may be associated with respective user devices 115a, 115n. In some embodiments, the environment 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The GNSS satellites 101 may each include a processor, a memory, network communication hardware, a power system, and a propulsion system. The network communication system may include antennas and transponders that receive and retransmit signals. The power system may include solar panels that provide the power.

The GNSS satellites 101 are communicatively coupled to the network 105 via signal line 102. Signal line 102 may be a wireless connection, such as radio. In some embodiments, the GNSS satellites 101 send and receive data to and from one or more of the user devices 115a, 115n via the network 105. For example, the GNSS satellites 101 send signals that include ranging signals and navigation data to the user devices 115a, 115n.

The user device 115 may be a computing device that includes a memory, a hardware processor, a GNSS receiver, and a satellite application 103. The user device 115 may include a mobile device, a tablet computer, a laptop, a mobile telephone, a wearable device, a head-mounted display, a mobile email device, a navigation device (such as in an automobile or other vehicle), or another electronic device capable of accessing a network 105 to communicate with a GNSS satellite 101.

In the illustrated implementation, user device 115a is coupled to the network 105 via signal line 108 and user device 115n is coupled to the network 105 via signal line 110. Signal lines 108 and 110 may be wireless connections, such as radio, Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

The satellite application 103 stored on the user device 115 receives a request from a user 125 for one or more services associated with the GNSS satellites 101. For example, the user 125 may activate the satellite application 103 to track a trip in an automobile. While the satellite application 103 performs an initialization process, the satellite application 103 provides a graphical user interface (GUI) that includes information about the satellites. The initialization process may include acquisition of one or more signals from the GNSS satellites 101, decoding time of week (TOW) information, and ephemeris decoding. The GUI may include, for example, a map of the satellites that shows their travel path, a signal quality status, ionospheric variation, etc. As a result of displaying a GUI that shows the complexity of the GNSS satellites 101, the user 125 is entertained by the GUI, but is also educated about why the initialization process is important due to the complexity displayed in the GUI.

Once the initialization process is complete, the satellite application 103 updates the GUI to include an option to provide the one or more services associated with the satellites. For example, the GUI may now allow movement in the automobile to be tracked.

Computing Device 200 Example

Figure 2:
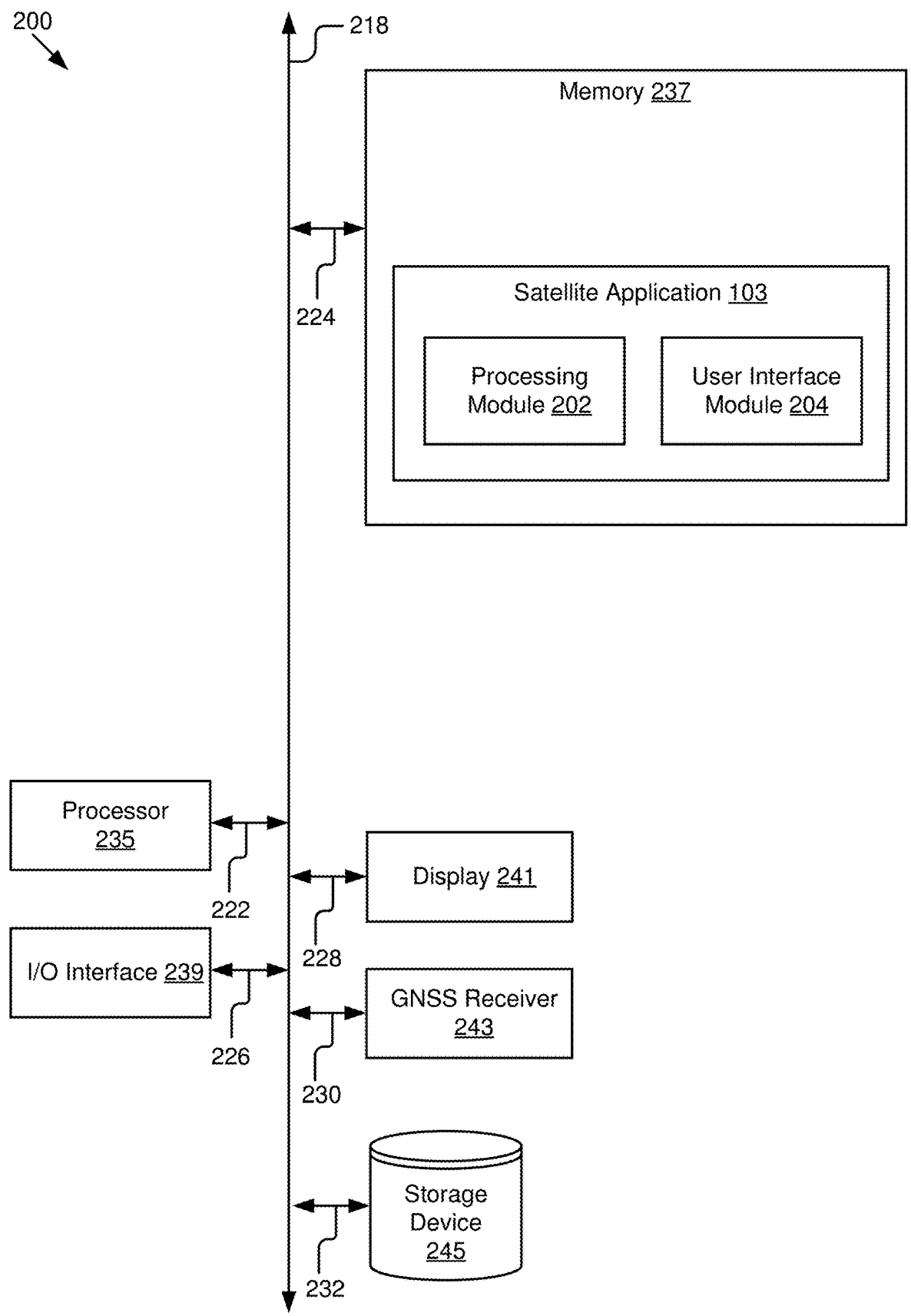
FIG. 2 is a block diagram of an example computing device according to some embodiments described herein.

FIG. 2 is a block diagram of an example computing device 200 that may be used to implement one or more features described herein. The computing device 200 can be any suitable computer system, server, or other electronic or hardware device. In one example, the computing device 200 is the user device 115 illustrated in FIG. 1.

In some embodiments, computing device 200 includes a processor 235, a memory 237, an Input/Output (I/O) interface 239, a display 241, a GNSS receiver 243, and a storage device 245. The processor 235 may be coupled to a bus 218 via signal line 222, the memory 237 may be coupled to the bus 218 via signal line 224, the I/O interface 239 may be coupled to the bus 218 via signal line 226, the display 241 may be coupled to the bus 218 via signal line 228, the GNSS receiver 243 may be coupled to the bus 218 via signal line 230, and the storage device 245 may be coupled to the bus 218 via signal line 232.

The processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, or other systems. A computer may be any processor in communication with a memory.

The memory 237 is typically provided in computing device 200 for access by the processor 235 and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including the satellite application 103.

The I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., the memory 237 or the storage device 245), and input/output devices can communicate via I/O interface 239. In some embodiments, the I/O interface 239 can connect to interface devices such as input devices (keyboard, pointing device, touchscreen, microphone, sensors, etc.) and/or output devices (display devices, speaker devices, etc.).

Some examples of interfaced devices that can connect to I/O interface 339 can include a display 341 that can be used to display content, e.g., a GUI, and to receive touch (or gesture) input from a user. Display 341 can include any suitable display device such as a liquid crystal display (LCD), light emitting diode (LED), or plasma display screen, cathode ray tube (CRT), television, monitor, touchscreen, three-dimensional display screen, or other visual display device. For example, display 341 can be a flat display screen provided on a mobile device, multiple display screens embedded in a glasses form factor or headset device, or a monitor screen for a computer device.

The GNSS receiver 243 includes one or more antennas and a radio frequency (RF) front end. In some embodiments, the RF front end includes a low-noise amplifier (LNA), a mixer, a band-pass filter (BPF), and an Analog-to-Digital-Converter (ADC). The one or more antennas receive a signal at a radio frequency from the GNSS satellites 101. The RF front end processes the signal by, for example, converting the signal at a radio frequency to a lower intermediate frequency and digitizing the lower intermediate frequency signal. The GNSS receiver 243 transmits the digitized signal to the satellite application 103 via the I/O interface 239.

The storage device 245 stores data related to the satellite application 103. For example, the storage device 245 may store data about the GNSS satellites 101 that is used in generating the GUIs. For example, the data about the GNSS satellites 101 may include a status of the GNSS satellites 101, an identity of the GNSS satellites 101, a signal quality status, a multipath plot of the GNSS satellites 101, radar signals of the GNSS satellites 101, etc. In some embodiments, the data about the GNSS satellites 101 is updated periodically, such as every second, minute, hour, etc.

Example Satellite Application 103

In some embodiments, the satellite application 103 includes a processing module 202 and a user interface module 204.

The processing module 202 processes signals received by the GNSS satellites 101. In some embodiments, the processing module 202 includes a set of instructions executable by the processor 235 to process the signals. In some embodiments, the processing module 202 is stored in the memory 237 of the computing device 200 and can be accessible and executable by the processor 235.

In some embodiments, the processing module 202 receives a request from a user for one or more services associated with satellites. For example, the services may include tracking a location of the user device 115 by using the signals from the GNSS satellites 101 to determine the location of the computing device 200.

The processing module 202 begins an initialization process before providing the one or more services. The initialization process may be used to establish a signal with each of the GNSS satellites 101, synchronize time information, and determine the location of each of the GNSS satellites 101 based on the ranging signals and navigation data received from the GNSS satellites 101 via the I/O interface 239.

The initialization process includes acquiring signals from each of the GNSS satellites 101. In some embodiments, the processing module 202 uses the current time, the last known position of the user device 115, and the almanac data to determine which GNSS satellites 101 are visible from the user device's 115 viewpoint. For the visible GNSS satellites 101, the processing module 202 provides an initial estimate of a phase shift of a corresponding pseudo-random number (PRN) code and Doppler frequency shift of the carrier. The processing module 202 needs at least four visible GNSS satellites 101 to perform calculations for determining the position of the user device 115.

The initialization process includes decoding time-of-week (TOW) information. The processing module 202 extracts TOW information from the navigation data. The processing module 202 may use the TOW information to synchronize the time of the GNSS receiver 243 with the satellite. In some embodiments, the processing module 202 performs synchronization computing the pseudorange for the at least four satellites based on a time delay between a transmitted time and a received time of the navigation data transmitted from each of the GNSS satellites 101. The processing module 202 may need at least six seconds to decode the TOW information when the signal conditions are good, but it may take longer under weak signal conditions.

In some embodiments, the initialization process includes ephemeris decoding. The processing module 202 extracts the ephemeris information from the navigation data. The ephemeris information includes a week number, satellite accuracy and health, age of the navigation data, satellite clock correction coefficients, and orbital parameters. The processing module 202 uses the ephemeris information to determine the location of the GNSS satellites 101. The processing module 202 may need at least 30 seconds to decode the ephemeris information because the processing module 202 needs new ephemeris information from the visible GNSS satellites 101 instead of using data stored in the storage device 245.

While the initialization process is occurring, the processing module 202 may instruct the user interface module 204 to provide a GUI that includes information about one or more GNSS satellites 101. Once the initialization process is complete, the processing module 202 may instruct the user interface module 204 to update the GUI to include an option to provide the one or more services associated with the one or more GNSS satellites 101. For example, the GUI may include an option for starting the process of tracking the location of the user device 115.

The user interface module 204 generates a user interface. In some embodiments, the user interface module 204 includes a set of instructions executable by the processor 235 to generate the user interface. In some embodiments, the user interface module 204 is stored in the memory 237 of the computing device 200 and can be accessible and executable by the processor 235.

In some embodiments, the user interface module 204 receives instructions from the processing module 202 to generate a GUI that includes information about the GNSS satellites 101. In some embodiments, the user interface module 204 receives the information about the GNSS satellites 101 from the storage device 245, where the information includes details such as the last known position of a GNSS satellite 101, a status of the GNSS satellite 101, a signal strength of the GNSS satellite 101, etc. In some embodiments, the user interface module 204 displays multiple GUIs and switches between the different GUIs after a predetermined amount of time (e.g., five seconds, 10 seconds, etc.) or in response to receiving user input requesting a different GUI (e.g., where the user wants to toggle between different GUIs).

The GUIs illustrated in FIGS. 3A-3F may be displayed on different types of user devices 115 and revised accordingly. For example, where the user device 115 is a smartwatch, the screen is small and does not include as much information as a display for a tablet.

Figure 3A:
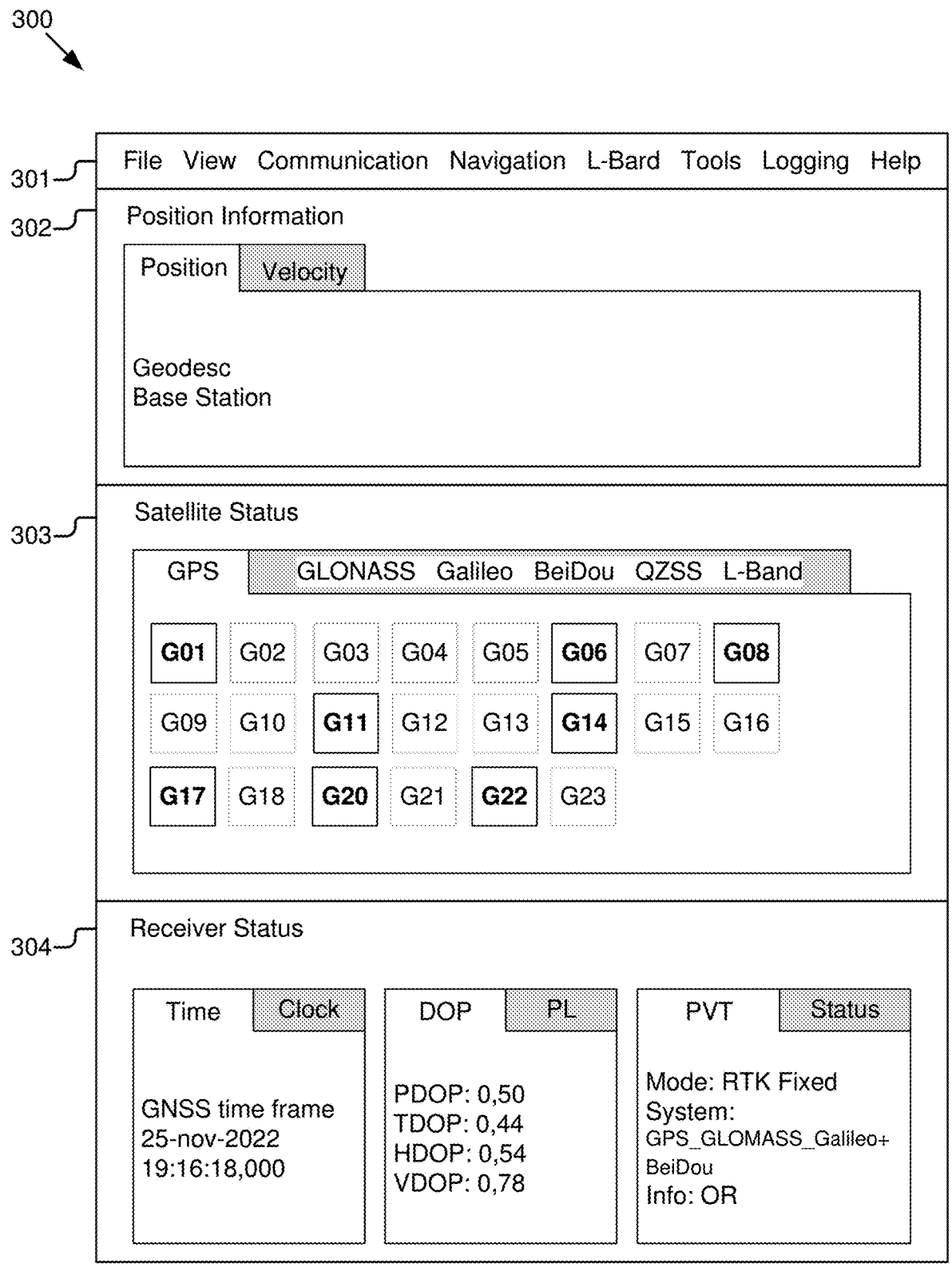
FIG. 3A illustrates an example graphical user interface (GUI) that includes information about the satellites according to some embodiments described herein.

FIG. 3A illustrates an example graphical user interface (GUI) 300 that includes information about the satellites. In this example, the GUI is designed for a larger screen. The header 301 includes different GUI options for viewing: file, view, communication, navigation, l-bard, tools, logging, and help. In some embodiments, the base station information is optional.

The GUI 300 is divided into three areas of information: position information 302, satellite status 303, and receiver status 304. The position information 302 is further divided into a position tab and a velocity tab. The position tab includes geodescription information and base station information.

The satellite status 303 includes a list of all the satellites associated with different GNSS systems. In this example, the satellite status includes tabs for GPS, GLONASS, Galileo, BeiDou, QZSS, and L-band. L-band is a designation for the range of frequencies in the radio spectrum from 1 to 2 gigahertz. Most satellites operate in the L-band because L-band waves penetrate obstructions, such as clouds, fog, rain, storms, and vegetation. The GUI 300 illustrates the GPS tab, which includes a list of 23 GPS satellites. The satellite numbers that are bolded represent the active satellites. The satellite numbers that are gray represent the inactive satellites.

The receiver status 304 includes different information about the receiver status including the time, clock information, and other parameters.

Figure 3B:
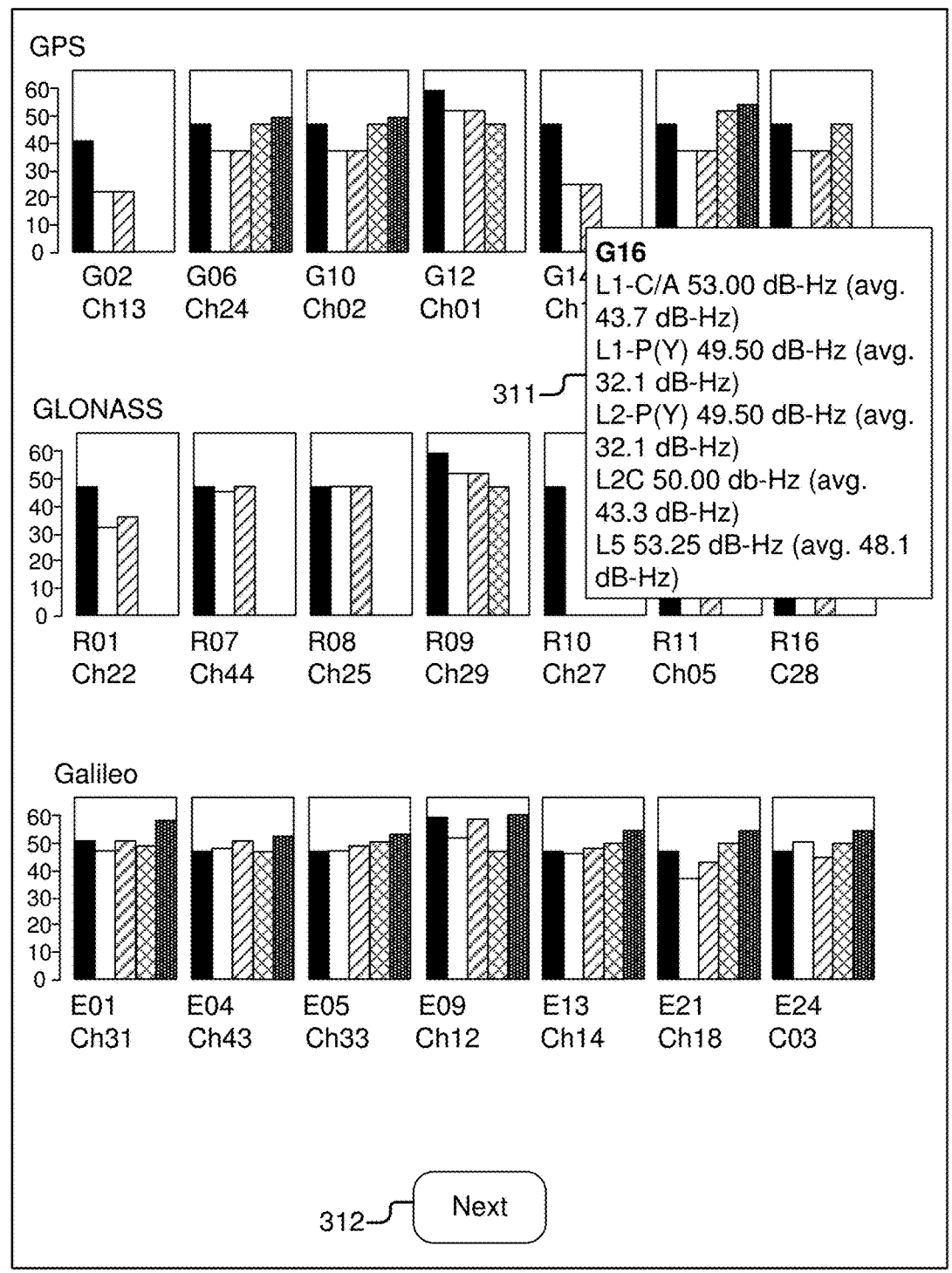
FIG. 3B illustrates an example GUI that includes a signal quality status of the satellites according to some embodiments descried herein.

FIG. 3B illustrates an example GUI 310 that includes a signal quality status of the satellites with a carrier-to-noise plot. The GNSS satellites are divided according to the different types of satellites. In this example, the GPS satellites, the GLONASS satellites, and the Galileo satellites are illustrated. Each satellite is associated with a satellite identifier and a channel. The bar graph for each satellite illustrates the average levels of the frequency of the signals in dB-Hz of each band. The bands include one or more of L1-Coarse/Acquisition (C/A), L1-P(Y), L2-P(Y), L2C, and L5.

In this example, a user selected the G16 GPS satellite (e.g., by double tapping on the G14 bar graph) and the user interface module 204 displayed more information about each of the bands.

The GUI 310 may be designed for a larger user device 115, such as a tablet, and as such it includes a next button 312 that a user may select to switch to a different user interface. Although the next button 312 is illustrated in FIG. 3B and not the other GUIs, the next button 312 or another indicator for toggling through the GUIs is possible for the other GUIs. Where the GUI 310 is part of a smaller user device 115, such as a smartphone, instead of including a next button 312 that may be too small for a smaller window, a user may switch to a different user interface by touching a screen of the user device 115 and making a swiping movement.

Figure 3C:
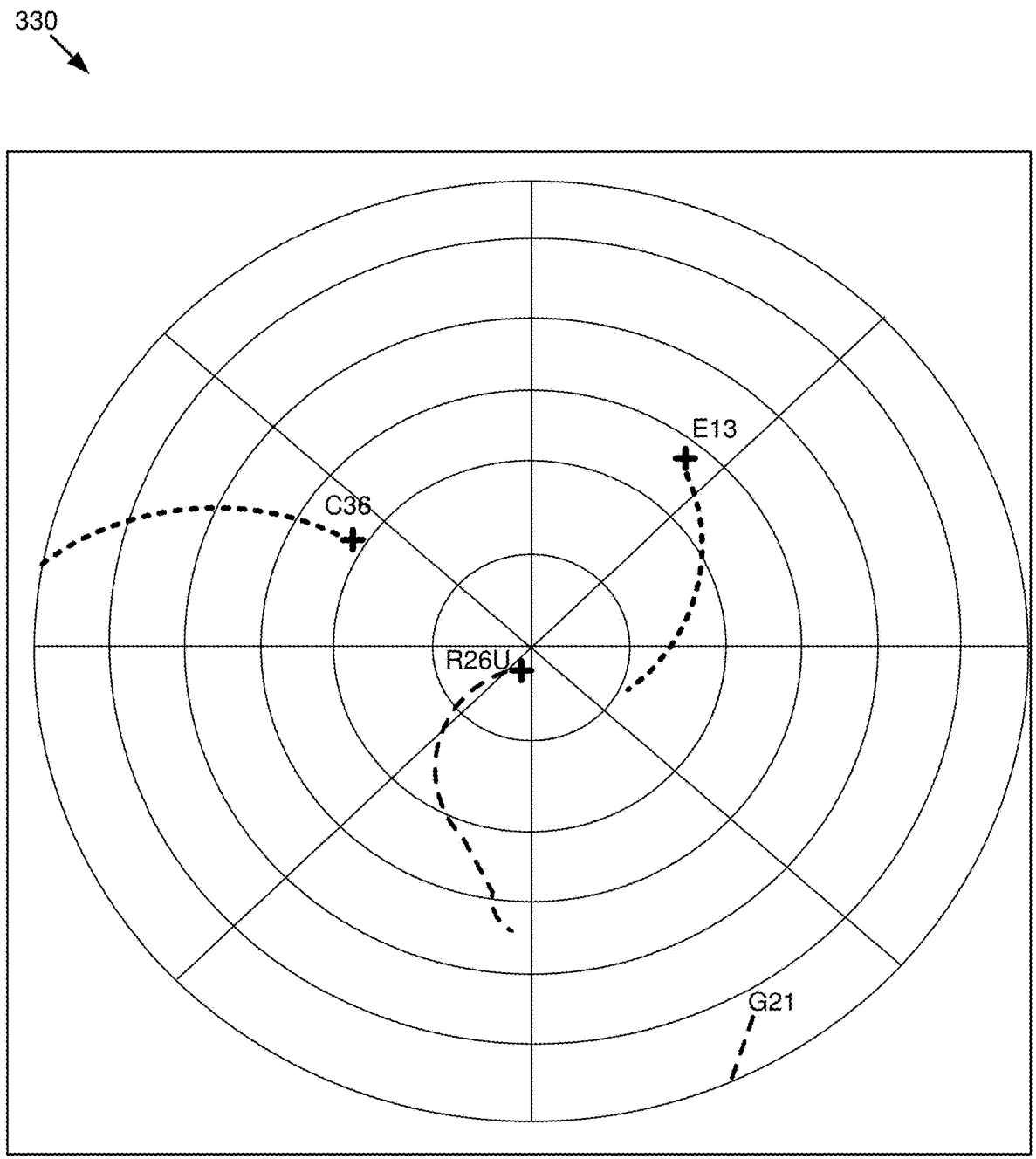
FIG. 3C illustrates an example GUI that includes a map of the satellites according to some embodiments described herein.

FIG. 3C illustrates an example GUI 330 that includes a map of the satellites. In this example, a multi-constellation GNSS sky plot is illustrated with the names of each of the satellites and the movement of each of the GNSS satellites 101 across the sky. In this example, the GUI 330 is displayed on a smaller screen, such as a smartwatch, and as a result, a subset of the GNSS satellites 101 is displayed on the GUI 330 so that the individual paths of the subset of the GNSS satellites 101 are identifiable.

Figure 3D:
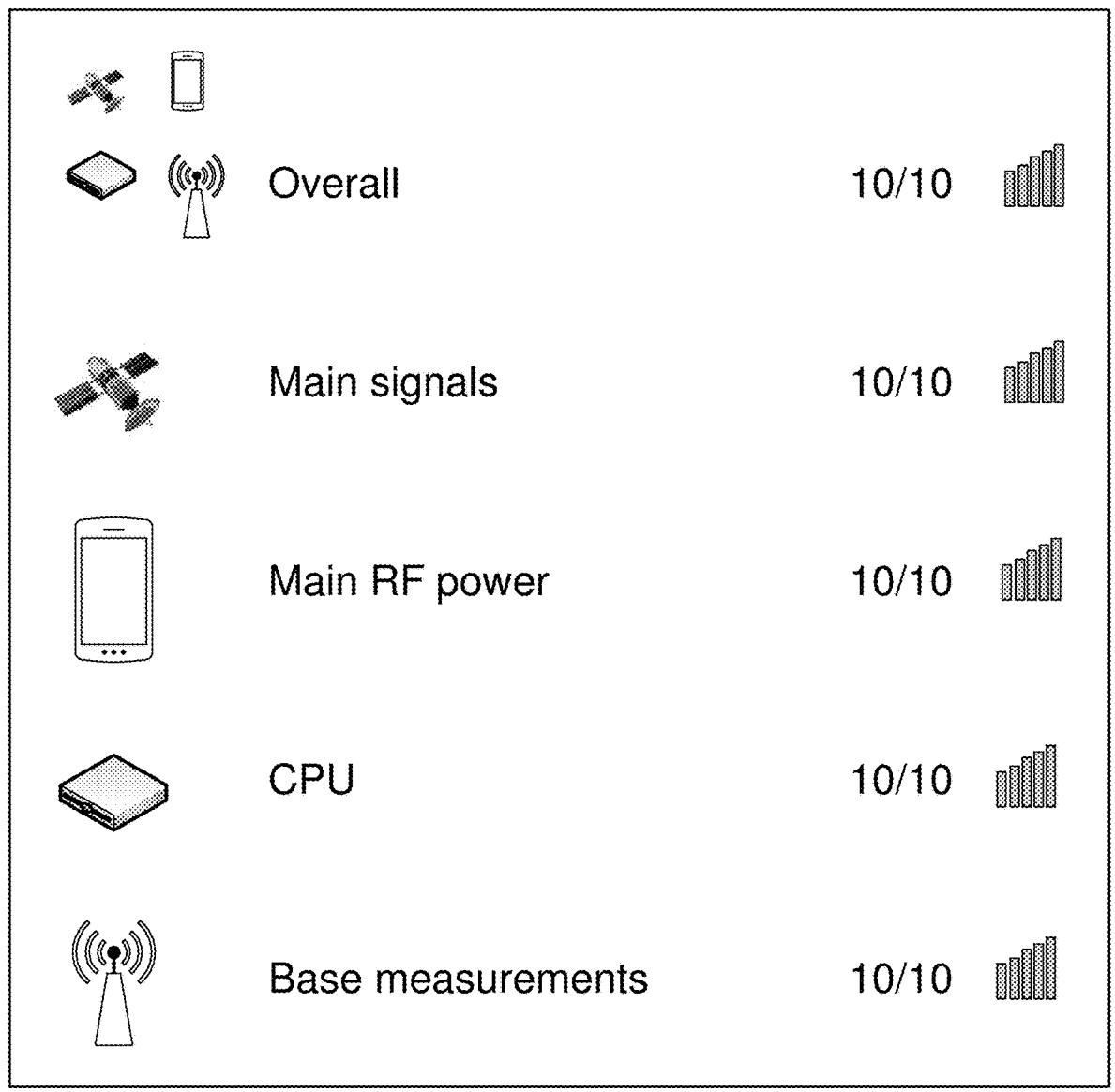
FIG. 3D illustrates an example GUI that includes different types of signal quality statuses according to some embodiments described herein.

FIG. 3D illustrates an example GUI 340 that includes different types of signal quality statuses. In this example, the GUI 340 includes an overall quality signal status of 10/10 that includes an average quality status for the satellites, the GNSS receiver, a Computer Processing Unit (CPU), and the base station. The GUI 340 also includes a main signal quality status of the GNSS satellites, which in this case is 10/10. The GUI 340 also includes a main Radio Frequency (RF) power quality status of the GNSS receiver, a Computer Processing Unit (CPU) quality status of 10/10, and a base measurements quality status of a base station that is 10/10.

Figure 3E:
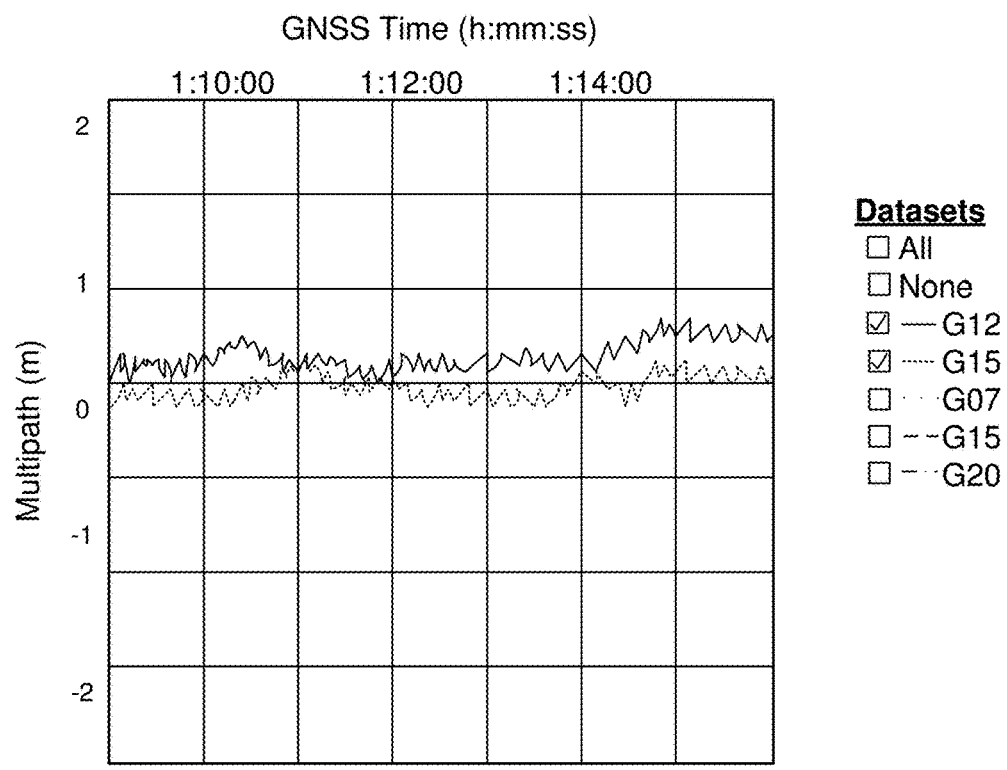
FIG. 3E illustrates an example GUI that includes a multipath plot that is used to analyze multipath errors according to some embodiments described herein.

FIG. 3E illustrates an example GUI 350 that includes a multipath plot that is used to analyze multipath errors. The GUI 350 illustrates the path of different satellites as a function of time. The GUI 350 includes the option of clicking on different boxes to add satellites to the graph. In this example, the GPS satellites labelled G12 and G15 are compared. The GUI 350 helps illustrate multipath errors by comparing different satellite paths, such that there is a visible indication when one of the paths of a corresponding satellite deviates from the path of the other satellites.

Figure 3F:
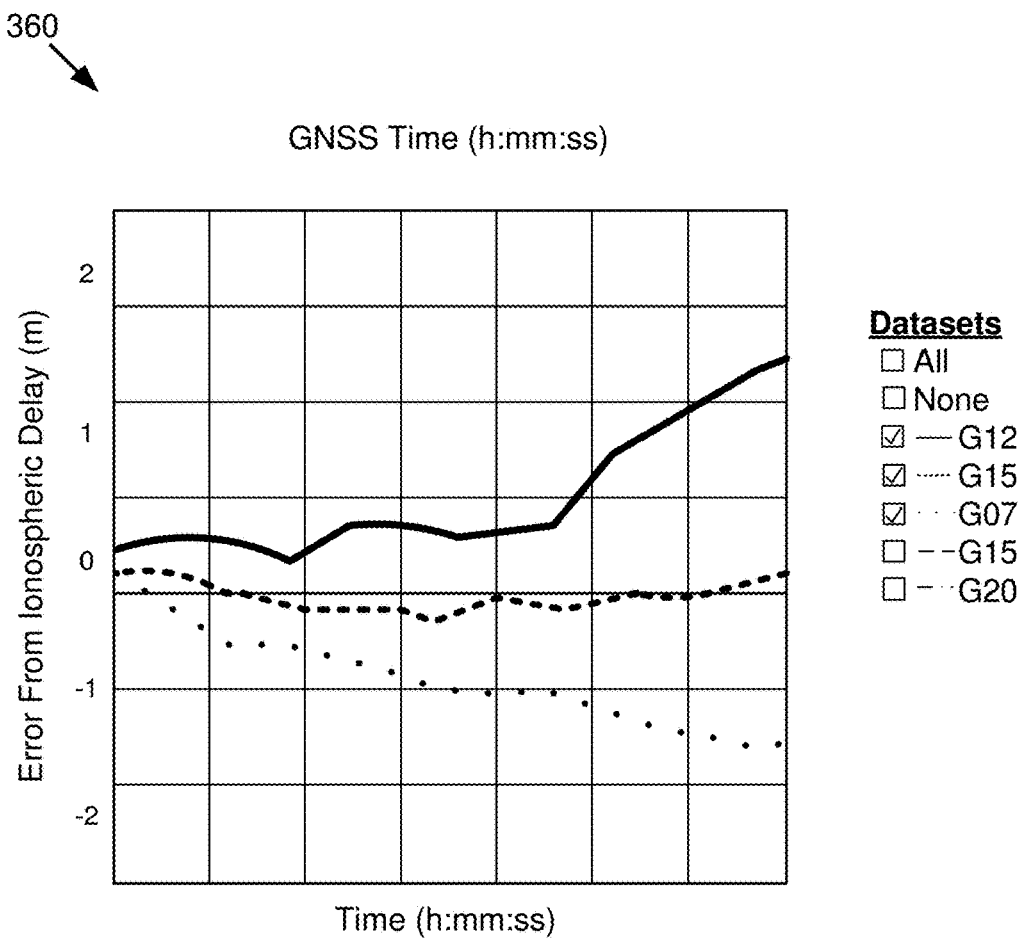
FIG. 3F illustrates an example GUI that includes ionospheric variation that is illustrated with a dual frequency carrier difference according to some embodiments described herein.

FIG. 3F illustrates an example GUI 360 that includes ionospheric variation that is illustrated with a dual frequency carrier difference. The GUI 360 illustrates an error in meters from ionospheric delay in meters as a function of time. The GUI 360 includes the option of clicking on different boxes to add satellites to the graph. In this example, the GPS satellites labelled G12, G15, and G07 are compared.

Once the initialization process is complete, the user interface module 204 may receive instructions from the processing module 202 to update the GUI with an option to provide the one or more services associated with the satellites. For example, the user interface module 204 may switch from the GUIs that provide information about the GNSS satellites 101 to a GUI with a start button for tracking the location of the user device 115. In some embodiments, the processing module 202 updates the satellite information stored in the storage device 245 so that the satellite information is updated for the user interface module 204 to use for subsequent generation of GUIs.

Example Method 400

Figure 4:
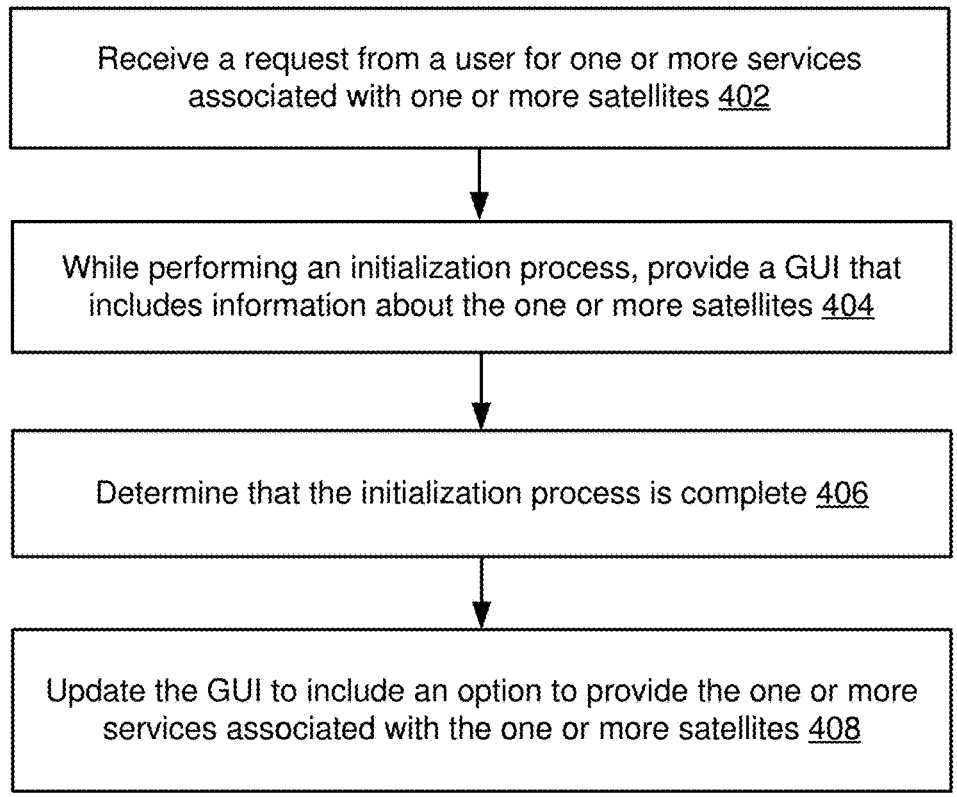
FIG. 4 illustrates a flowchart for illustrating a global navigation satellite system acquisition process according to some embodiments described herein.

FIG. 4 illustrates an example method 400 for illustrating a global navigation satellite system acquisition process. The method illustrated in flowchart 400 may be performed by the computing device 200 in FIG. 2. For example, the computing device 200 is the user device 115 and includes a satellite application 103.

The method 400 may start with block 402. At block 402, a receive is received from a user for one or more services associated with satellites. For example, the service may be tracking the location of a vessel on the water. Block 402 may be followed by block 404.

At block 404, while performing an initialization process, a GUI is provided that includes information about the satellites. The initialization may include acquisition of one or more signals from the satellites, decoding time-of-week (TOW) information, and ephemeris decoding. Block 404 may be followed by block 406.

At block 406, it is determined that the initialization process is complete. In some embodiments, initialization is not complete until all three of signal acquisition, decoding TOW information, and ephemeris decoding are complete. Block 406 may be followed by block 408.

At block 408, the GUI is updated to include an option to provide the one or more services associated with the satellites.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. An apparatus comprising:
a display device;
a storage for storing complex satellite information about particular satellites;
one or more processors; and
logic encoded in one or more non-transitory media for execution by the one or more processors and when executed operable to:
receive a request from a user for one or more services associated with satellites;
prior to providing the one or more services, perform an initialization process during which satellite signals are initially acquired and data are decoded including ephemeris data;
retrieve from the storage, the complex satellite information that was previously updated, including one or more of: a map of travel paths of at least one of the particular satellites, ionospheric variation, signal quality status of at least one of the plurality of the satellites, and receiver status;

in response to receiving the request and while performing the initialization process, automatically-render on the display device at least one graphical user interface (GUI) that includes the complex satellite information for entertainment and engagement of the user while waiting for completion of the initialization process;

determine that the initialization process is complete; and in response to the initialization process being complete, update the GUI to include an option to start the one or more services associated with one or more of the particular satellites.

2. The apparatus of claim 1, wherein the complex satellite information further includes one or more of: (i) position and velocity information, and (ii) a status of at least one of the particular satellites including an identification of at least one of the particular satellites that are active for one or more types of GNSS.

3. The apparatus of claim 1, wherein the complex satellite information includes the signal quality status for at least one of the particular satellites, which is based on an identification of each type of band with a signal and a frequency of the signal for the type of band, where the type of band is selected from the group of L1-Coarse/Acquisition (C/A), L1-P (Y), L2-P (Y), L2C, L5, and combinations thereof.

4. The apparatus of claim 1, wherein the complex satellite information includes the signal quality status, which is selected from the group of: an overall signal quality status, main signal quality status, main Radio Frequency (RF) power quality status, a Computer Processing Unit (CPU) quality status, base measurements quality status, and combinations thereof.

5. The apparatus of claim 1, wherein the complex satellite information includes the map of travel paths of at least one of the particular satellites, which includes a multipath plot that is used to analyze multipath errors.

6. The apparatus of claim 1, wherein the complex satellite information includes the ionospheric variation, which is based on a dual frequency carrier difference.

7. The apparatus of claim 1, wherein the complex satellite information includes one or more radar signals corresponding to the one or more particular satellites as a function of time.

8. The apparatus of claim 1, wherein the data further includes time-of-week (TOW) information.

9. The apparatus of claim 1, wherein the initialization process further includes synchronizing time information and determining the location of each of the one or more of the particular satellites based on the satellite signals and navigation data received from the particular satellites.

10. The apparatus of claim 1, wherein the GUI includes multiple screens to display the complex satellite information, and
wherein the logic is further operable to receive a user selection to switch to a different screen during the initialization process.

11. A computer-implemented method comprising:
receiving a request from a user for one or more services associated with satellites;

prior to providing the one or more services, performing an initialization process during which satellite signals are initially acquired and data are decoded including ephemeris data;

retrieving from the storage, the complex satellite information that was previously updated, including one or more of: a map of travel paths of a plurality of satellites, ionospheric variation, signal quality status of the plurality of the satellites, and receiver status;

in response to receiving the request and while performing the initialization process, automatically-rendering on the display device at least one graphical user interface (GUI) that includes the complex satellite information to display for entertainment and engagement of the user while waiting for completion of the initialization process;

determining that the initialization process is complete; and in response to the initialization process being complete, update the GUI to include an option to start the one or more services associated with the one or more particular satellites.

12. The computer-implemented method of claim 11, wherein the complex satellite information further includes one or more of: (i) position and velocity information, (ii) a status of at least one of the particular satellites including an identification of at least one of the particular satellites that are active for one or more types of GNSS.

13. The computer-implemented method of claim 11, wherein the complex satellite information includes the signal quality status for at least one of the particular satellites, which is based on an identification of each type of band with a signal and a frequency of the signal for the type of band, where the type of band is selected from the group of L1-Coarse/Acquisition (C/A), L1-P (Y), L2-P (Y), L2C, L5, and combinations thereof.

14. The computer-implemented method of claim 11, wherein the complex satellite information includes signal quality status, which is selected from the group of: an overall signal quality status, main signal quality status, main Radio Frequency (RF) power quality status, a Computer Processing Unit (CPU) quality status, base measurements quality status, and combinations thereof.

15. One or more non-transitory computer-readable media including instructions for execution by one or more processors and when executed is operable to:
receive a request from a user for one or more services associated with satellites;

prior to providing the one or more services, perform an initialization process during which satellite signals are initially acquired and data are decoded-including ephemeris data;

retrieve from the storage, the complex satellite information that was previously updated, including one or more of: a map of travel paths of a plurality of satellites, ionospheric variation, signal quality status of the plurality of the satellites, and receiver status;

in response to receiving the request and while performing the initialization process automatically rendering on the display device at least one graphical user interface (GUI) that includes the complex satellite information for entertainment and engagement of the user while waiting for completion of the initialization process;

determine that the initialization process is complete; and in response to the initialization process being complete, update the GUI to include an option to start the one or more services associated with the one or more of the particular satellites.

16. The one or more non-transitory computer-readable media of claim 15, wherein the complex satellite information includes one or more of: (i) position and velocity information, and (ii) a status of at least one of the particular satellites including an identification of at least one of the particular satellites that are active for one or more types of GNSS.

17. The one or more non-transitory computer-readable media of claim 15, wherein the complex satellite information includes the signal quality status for at least one of the particular satellites, which is based on an identification of each type of band with a signal and a frequency of the signal for each type of band, where the type of band is selected from the group of L1-Coarse/Acquisition (C/A), L1-P (Y), L2-P (Y), L2C, L5, and combinations thereof.

18. The one or more non-transitory non-transitory computer-readable media of claim 16, wherein the complex satellite information includes the signal quality status, which is selected from the group of: an overall signal quality status, main signal quality status, main Radio Frequency (RF) power quality status, a Computer Processing Unit (CPU) quality status, base measurements quality status, and combinations thereof.

* * * * *